United States Patent [19]
Kennedy et al.

[11] Patent Number: 5,483,193
[45] Date of Patent: Jan. 9, 1996

[54] CIRCUIT FOR DEMODULATING FSK SIGNALS

[75] Inventors: John F. Kennedy, Dearborn; Scott O. Campbell; Lawrence P. Kirk, both of Canton, all of Mich.; David P. Laude, Colorado Springs; Luke A. Perkins, Security, both of Colo.

[73] Assignee: Ford Motor Company, Dearborn, Mich.

[21] Appl. No.: 409,397

[22] Filed: Mar. 24, 1995

[51] Int. Cl.[6] .............................. H03D 3/00; H04L 27/00
[52] U.S. Cl. ....................... 329/300; 375/334; 340/825.31
[58] Field of Search ....................................... 329/300–303, 329/341–343; 360/20, 27, 28, 30, 43, 48, 51; 375/334–337; 327/48, 49; 340/825.31, 825.32

[56] References Cited

U.S. PATENT DOCUMENTS

| | | |
|---|---|---|
| 3,230,457 | 1/1966 | Soffel . |
| 3,470,478 | 9/1969 | Crafts . |
| 3,543,172 | 11/1970 | Seppeler . |
| 3,571,712 | 3/1971 | Hellwarth et al. . |
| 3,601,710 | 8/1971 | Morra . |
| 3,670,250 | 6/1972 | Fritkin .................................. 329/343 |
| 3,729,587 | 4/1973 | McGill, Jr. et al. . |
| 3,739,288 | 6/1973 | Coccagna . |
| 3,743,775 | 7/1973 | Hutchinson et al. . |
| 3,794,928 | 2/1974 | Stump et al. . |
| 3,899,741 | 8/1975 | Brandt et al. . |
| 3,993,868 | 11/1976 | Balcewicz . |
| 4,335,354 | 6/1982 | Crandall et al. . |
| 4,472,816 | 9/1984 | Thompson . |
| 4,475,219 | 10/1984 | Puckette . |
| 4,485,347 | 11/1984 | Hirasawa et al. . |
| 4,529,941 | 7/1985 | Lipoff . |
| 4,568,882 | 2/1986 | Single . |
| 4,574,247 | 3/1986 | Jacob . |
| 4,752,742 | 6/1988 | Akaiwa . |
| 4,785,255 | 11/1988 | Lucak et al. . |
| 4,926,444 | 5/1990 | Hamilton et al. . |
| 5,333,151 | 7/1994 | Kennedy et al. . |
| 5,339,333 | 8/1994 | Zehngut et al. ..................... 329/301 X |

*Primary Examiner*—David Mis
*Attorney, Agent, or Firm*—Kevin G. Mierzwa; Roger L. May

[57] ABSTRACT

A circuit and method of demodulating an FSK signal uses digital circuitry to convert the received signal into count values. For each reception an adaptive reference count value is determined by averaging the duration of received pulses during the preamble of the transmission. The adaptive reference count corresponds to a demodulated logic "1" or logic level "0". The counts from the coded portion of the transmission are compared to the adaptive reference count. If the count is within predetermined windows from the reference count, the count value is converted to the corresponding digital signal.

20 Claims, 2 Drawing Sheets

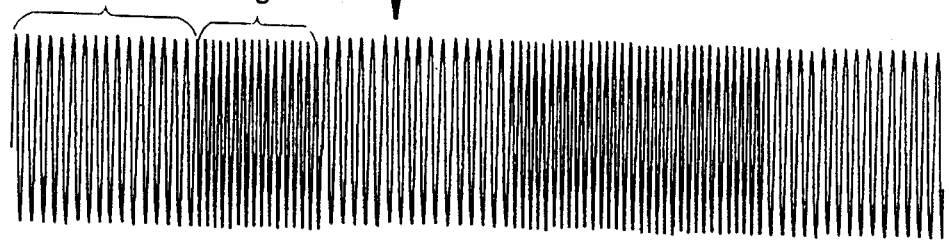
16 cycles of 123KHz "logic 1"  16 cycles of 134KHz "logic 0"
FIG.2  (SIGNAL A)
(SIGNAL B)  FIG.3
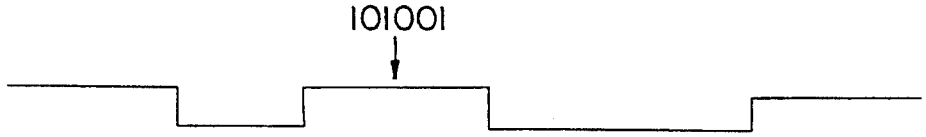
101001
FIG.4
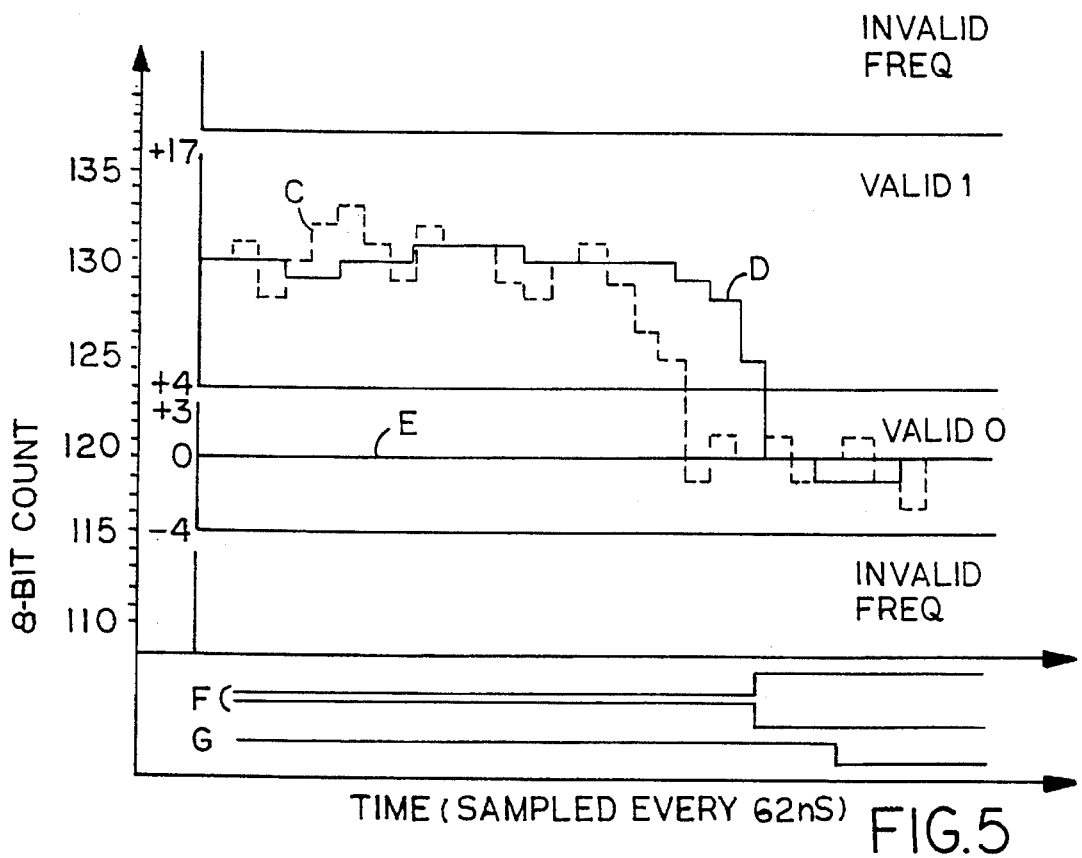
FIG.5

5,483,193

CIRCUIT FOR DEMODULATING FSK SIGNALS

BACKGROUND OF THE INVENTION

The present invention is directed to frequency-shift keyed (FSK) demodulating circuits and more specifically to an adaptive digital demodulating circuit.

Frequency-shift keyed signals are found in a variety of applications involving data transmission such as RF transmissions and telephone data transmission. FSK signals use two distinct frequencies to represent logic level "1" signal and the logic level "0" signals. A demodulating circuit converts the frequency data to a digital format for use in associated circuitry.

Several techniques are known for demodulating FSK signals. One method described in U.S. Pat. No. 4,574,247 requires the derivation of a reference signal from a full data signal train that requires both the "1" and "0" frequencies to be present. The two frequencies must be present for a relatively large amount of time to set a reference before data reception. The reference value obtained represents a frequency between the logic 0 value and the logic 1 value. One disadvantage of the circuit is that noise contained in the input signal causes the reference to be set incorrectly.

Other methods of demodulating an FSK signal use a phase lock loop to provide feedback. One drawback to such circuits is the high cost due to the high number of components. Another disadvantage is that during the manufacturing process the phase lock loop requires calibration. Such circuits are not easily manufacturable on a single integrated circuit.

It would be desirable to provide a low cost, low part count circuit that can be fabricated on one integrated circuit to reliably demodulate an FSK signal.

SUMMARY OF THE INVENTION

One object of the present invention is to provide an FSK demodulation circuit fabricated on a single integrated circuit.

One advantage of the present invention is that an adaptive reference count is determined in each transmission from a relatively small number of samples of either the logic 1 frequency or the logic 0 frequency.

The present invention is a circuit for demodulating an FSK signal having a first frequency with a corresponding first period and a second frequency with a corresponding second period. The FSK signal has a preamble with a period corresponding to a selected one of the first period or the second period and a coded signal portion which alternates between the first and second periods. The circuit includes a receiving means receiving an FSK signal and a clock means for generating a clock signal having a third frequency corresponding to a third period substantially shorter than the first period and the second period. The counter means is connected to the clock means and the receiving means for generating a count corresponding to a number of third periods of the clock signal during a period of the FSK signal. An averaging means is coupled to the counter means for calculating an adaptive reference count by averaging a predetermined number of counts during the preamble. The reference count represents either the high or low logic level. A comparing means compares the count occurring during the coded signal portion with the adaptive reference count. An output means provides a digital level output signal based on whether the count is within a predetermined range from the adaptive reference count, the predetermined range corresponds to either a valid low logic or a valid high logic.

BRIEF DESCRIPTION OF THE DRAWINGS

FIG. 2 is the analog signal received from the transponder.

FIG. 3 is a processed version of FIG. 2.

FIG. 4 is a digital message signal corresponding to the signals of FIGS. 1 and 2.

FIG. 5 is a graph of signals at predetermined points in FIG. 1.

DETAILED DESCRIPTION OF THE PREFERRED EMBODIMENT

Figure 1:
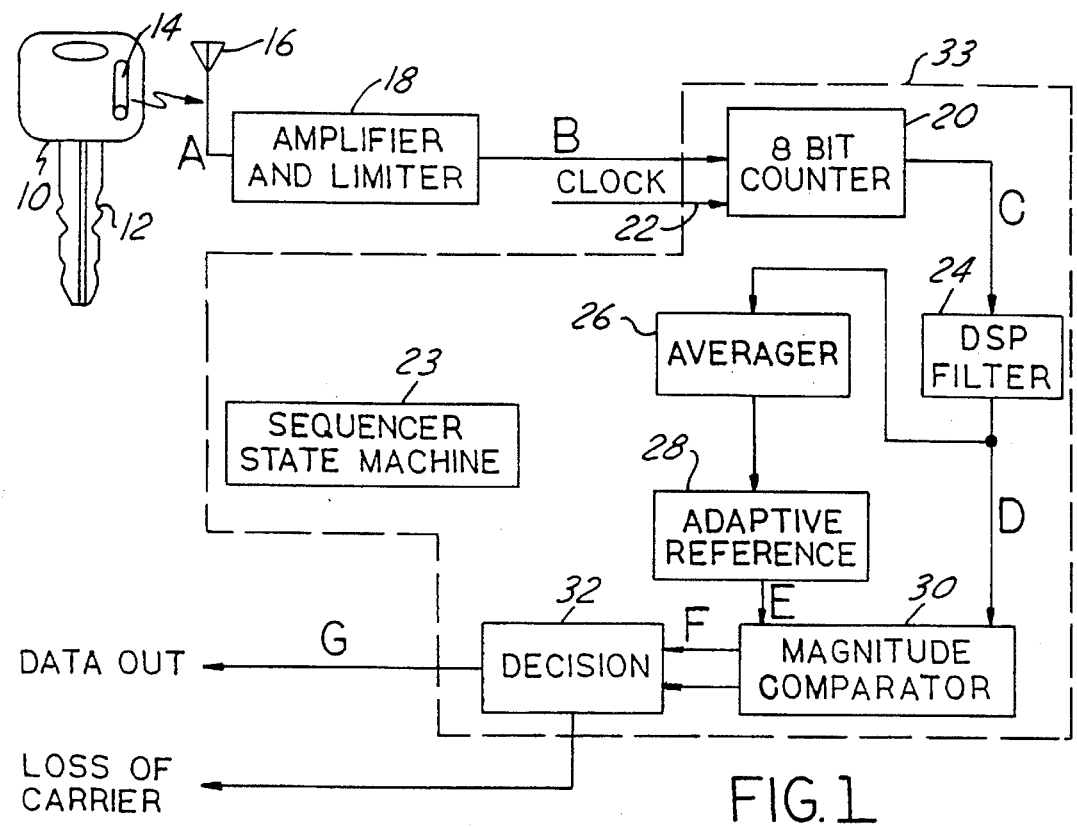
FIG. 1 is a block diagram of a passive anti-theft system including the demodulating circuit according to the present invention.

Referring to FIG. 1, a passive anti-theft system for a motor vehicle includes a key 10 having a shank portion 12 cut for insertion and mechanical activation of a lock cylinder (not shown). Key 10 also has an encoded transponder 14 that generates a coded FSK signal. A function, such as allowing an engine of an automobile to start, is enabled if both the code of the FSK signal and the cut key match the particular vehicle.

An antenna 16 receives the FSK signal transmitted from transponder 14 as a sinusoidal waveform, signal A in FIG. 2. The coded signal contains two frequencies, 123 KHz and 134 KHz that are eventually converted to a "logic 1" and a "logic 0" respectively. Each FSK signal generated by transponder 14 has a preamble or initial period 2 ms long of either the logic 1 or the logic 0 frequency to allow calculation of an adaptive reference as described further below. The coded portion of the signal follows the initial 2 ms.

The frequencies generated correspond to the specifications of transponder 14. The same antenna circuitry in the transponder transmits both the logic 1 and logic 0 frequencies. The circuitry in the transponder in this example is calibrated around the logic 0 frequency. Consequently, the frequency tolerance around the logic 0 frequency is much narrower than the logic 1 frequency. Logic 0 has a center frequency at 135.25±3.75 Hz and the logic 1 has a center frequency of 124±4 Hz. Because the same antenna and associated circuitry generate both the logic 0 and logic 1 frequencies, any drifts of the frequencies occurring due to temperature or other variations are essentially the same for both logic 1 and logic 0. As a result, only one frequency needs to be used in the preamble of the transmission for the purpose of obtaining a frequency reference in the receiver.

An amplifier and limiter block 18 processes the received analog signal and converts it into a square wave, signal B of FIG. 3. Block 18 uses a comparator to compare the amplitude of the analog signal to a reference voltage. The output signal of the comparator changes state when the input signal crosses the reference voltage threshold.

The output of amplifier and limiter block 18 is input to a digital counter 20 having an 8 bit output. It should be understood that the number of output bits may vary according to the range of counts required. Digital counter 20 is connected to a clock 22 that is a high precision clock source such as a crystal oscillator having a frequency substantially higher than the period of the signal transmitted by transponder 14. Clock 22 is preferably 16,104 MHz which is over 100 times faster than the FSK signal frequencies. Digital counter 20 counts the number of clock periods per period of the square wave from the amplifier and limiter block 18 (hereinafter referred to as counts). The time corresponding to one period (i.e., one count) is about 62 ns. The count value is a direct measurement of the period of the digital signal and has an inverse relationship to the frequency of the FSK signal from transponder 14. FIG. 5 shows a sample output of the digital count as signal C. The detection of where to start and stop counting may be performed by an edge detector.

A sequencer state machine 23 controls the flow of the signal throughout the circuit. Sequencer state machine 23 may be a microprocessor.

A DSP filter 24 processes the signals from digital counter 20 to improve the accuracy of the signal when noise commonly found in automotive environments is present. Although not required, DSP filter 24 can be used to improve the reliability of the system. Filter 24 may be implemented with a digital-to-analog converter in series with an RC low pass filter followed by an analog to digital converters a D-to-A converter in series with a switched capacitor type filter followed by an A-to-D converter or by using a straight feedback gain type DSP filter (an example of which is further described in reference to FIG. 6). Signal D of FIG. 5 is the output of DSP filter 24.

The counts from DSP filter 24 taken during the preamble of each transmission are input to an averager 26. Averager 26 averages the counts for a predetermined number of periods within the preamble. In the present invention the counts of ten cycles of the logic 0 frequency transmitted within the first 2 ms of each transmission are averaged. Adaptive reference block 28 stores the average of the ten cycles as the adaptive reference count for the transmission. Adaptive reference count is the basis for each of the subsequent logic level determinations of the following transmission. Adaptive reference count is signal E of FIG. 5.

Magnitude comparator 30 compares the adaptive reference count to the count of the processed FSK signal. Because the tolerances of the transponder, windows are set with respect to the adaptive reference count. The width of the windows is set according to tolerances of the transponder. In the present invention, logic 0 ranges from −4 to ∓counts from the adaptive reference count. Logic 1 is from +4 to +17 counts from the adaptive reference count. Invalid frequencies are those less than −4 counts and above 17 counts from the adaptive reference count. Magnitude comparator also provides an indication whether there has been a carrier time out which is a result of the counter overflowing. The output of magnitude comparator 30 shown as signal F of FIG. 5. is a 2 bit number shown according to the following chart:

| COMPARATOR OUTPUT | MEANING |
| --- | --- |
| 00 | Invalid frequency |
| 01 | Valid 0 |
| 10 | Valid 1 |
| 11 | Carrier time out |

A decision block 32 converts the two bit output of magnitude comparator 30 into a serial logic 0 or logic 1 level signal. Decision block 32 may directly translate the two bit output into a digital level signal or, in addition, decision block 32 acts as a form of digital filter. Decision block 32 in the present invention waits for a predetermined number of two bit outputs to be the same before changing its output signal as a further form of digital processing. For example, if the output of decision block 32 is a logic 1, then three consecutive logic 0s must be present before the output level changes. Also if four consecutive carrier timeouts occur, decision block 32 generates a loss of carrier signal indicating whether an incoherent signal is present. Signal G of FIG. 5 is the output of decision block.

Counter 20, sequencer state machine 23, DSP filter 24, averager 26, adaptive reference block 28, magnitude comparator 30, and decision block 32 may all be fabricated on one integrated circuit 33. Integrated circuit 33 receives the input signal and provides a digital level output signal.

Referring now to FIG. 5, a graph of the above mentioned signals is shown. In the beginning of the time period shown, a logic 1 is being transmitted. Sinal C is somewhat erratic due to noise. The smoothing effect of the digital filter on signal D is shown in comparison to signal C. Also, the output signal does not change from a logic 0 until three consecutive logic level 0s are received.

Figure 6:
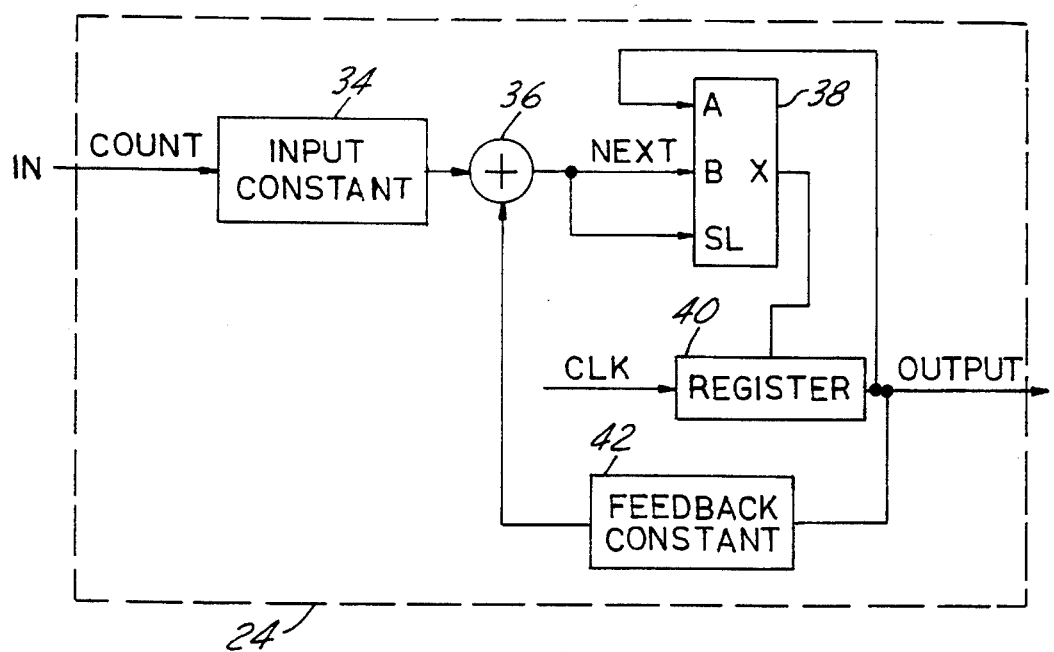
FIG. 6 is a detailed block diagram of the DSP filter of FIG. 1.

Referring now to FIG. 6, a preferred example of DSP filter 24 is shown. The input to the filter is a count from counter 20. The count is multiplied by an input constant in block 34. A summer 36 adds the output of the filter multiplied by a feedback constant 42 to get a signal called NEXT. The formula in algebraic terms is:

$$\text{NEXT} = \frac{(\text{INPUT CONSTANT}*\text{INPUT COUNT}) +}{(\text{REF CONSTANT}*\text{OUTPUT COUNT})}$$

An input constant for the above equation of 48 and a feedback constant of 208 have been satisfactorily employed.

A multiplexor 38 has two inputs: the NEXT signal and the OUTPUT signal, one of which is passed to a register 40. Multiplexor 38 switches inputs when the counter has stopped counting (i.e., on the edge of a subsequent input period). Register 40 stores the value from multiplexor 38. Multiplexor will only store a new count value in register 40 if the NEXT signal is within a predetermined range. For example, from the configurations described above, the predetermined range is between 90 to 160. If the NEXT signal is not within a predetermined range, the value in register 40 remains the same.

Various modifications will be apparent to those skilled in the art. For example, the FSK frequencies generated, the clock frequency, and the number and range of the counts are all modifications which are within the true spirit of the scope of the appended claims.

What is claimed is:

1. A circuit for demodulating an FSK signal having a first frequency with a corresponding first period and a second frequency with a corresponding second period, said FSK signal having a preamble with a period corresponding to a selected one of said first period or said second period and a coded signal portion which alternates between said first and second periods, said circuit comprising:

receiving means receiving said FSK signal;

clock means for generating a clock signal having a third frequency corresponding to a third period substantially shorter than said first period and said second period;

counter means connected to said clock means and said receiving means for generating a count corresponding to a number of third periods of said clock signal during a period of said FSK signal;

averaging means coupled to said counter means for calculating an adaptive reference count by averaging a predetermined number of counts during said preamble, said reference count representing either the high or low logic level;

comparing means for comparing said count occurring during said coded signal portion with said adaptive reference count;

output means providing a digital level output signal based whether said count is within a predetermined range from said adaptive reference count, said predetermined range corresponding to either a valid low logic or a valid high logic.

2. A circuit for demodulating FSK signals as recited in claim 1 wherein said predetermined range defines an invalid frequency.

3. A circuit for demodulating FSK signals as recited in claim 1 wherein said output means provides an overflow signal if said counter has overflowed.

4. A circuit for demodulating FSK signals as recited in claim 1 wherein said output means includes a decision-making means for changing the digital level output signal if a predetermined number of succeeding counts corresponds to a count of an opposite logic level.

5. A circuit for demodulating FSK signals as recited in claim 1 wherein said circuit further includes an amplifier and conversion means for converting said FSK signal to a square wave, both amplifier and conversion means connected to said counter means.

6. A circuit for demodulating FSK signals as recited in claim I wherein said circuit further includes a digital signal processing filter connected between said counting means and comparing means for filtering said count value.

7. A circuit for demodulating FSK signals as recited in claim 1 wherein a new reference level is set at each transmission.

8. A circuit for demodulating FSK signals as recited in claim 1 wherein said clock means has a frequency of about 16 MHz.

9. A circuit for demodulating FSK signals as recited in claim 1 wherein said average is taken over 10 periods of said FSK signal.

10. A circuit for demodulating FSK signals as recited in claim 1 wherein said cycle of said first and second period is at least 100 times larger than said period of said clock period.

11. A circuit for demodulating FSK signals having a first frequency with a corresponding first period and a second frequency with a corresponding second period, said FSK signal having a preamble with a period corresponding to said first or second period and a coded signal portion with both first and second periods, said circuit comprising:

receiving means receiving said FSK signal;

clock means for generating a clock signal having a third frequency with a third period substantially shorter than said first period and said second period;

counter means connected to said clock means and said receiving means for generating a count corresponding to a number of third periods occurring during a period of said FSK signal;

averaging means coupled to said counter means for calculating an adaptive reference count by averaging said count from a predetermined number of periods of said preamble, said reference count representing either the high or low logic level;

comparing means for comparing said count with said reference count and providing an output signal indicative of whether said count is within a first window limit from said reference or whether said count is within a second window from said reference count, said first and second windows corresponding to one of a low logic digital signal or a high logic digital signal;

output means connected to said comparing means for generating a digital level output signal if said output signal indicates said signal is within said first or second windows.

12. A circuit for demodulating FSK signals as recited in claim 11 wherein said first window around said reference count and said second window each have a predetermined width of counts as measured from said reference count.

13. A circuit for demodulating FSK signals as recited in claim 11 wherein said comparing means further provides an output signal corresponding to an invalid frequency if said count is outside said first or second window.

14. A circuit for demodulating FSK signals as recited in claim 11 wherein said comparing means further provides an output signal if said counter has overflowed.

15. A circuit for demodulating FSK signals as recited in claim 11 wherein said output means includes a decision-making means for changing the digital level output signal of a signal corresponding to one of said windows if a predetermined number of succeeding counts are within an opposite window.

16. A circuit for demodulating FSK signals as recited in claim 11 wherein said circuit further includes an amplifier and conversion means for converting said FSK signal to a square wave, both amplifier and conversion means connected to said counter means.

17. A circuit for demodulating FSK signals as recited in claim 11 wherein said circuit further includes a digital signal processing filter connected between said counting means and comparing means for filtering said count.

18. A method for demodulating an FSK signal having a first frequency with a corresponding first period and a second frequency with a corresponding second period, said FSK signal having a preamble with a period corresponding to said first period or said second period and a coded signal portion which alternates between said first and second periods, said method comprising the steps of:

receiving said FSK signal;

generating a clock signal having a clock frequency and a clock period shorter than said first period and said second period;

counting the number of clock periods in a predetermined number of periods of said preamble;

obtaining a plurality of preamble counts;

averaging said preamble counts to obtain a reference count;

counting the number of clock periods during a period of said coded signal portion to obtain a count;

comparing said count with said reference count;

providing an output signal indicative of whether said count is within a first window limit from said reference or whether said count is within a second window from said reference count, said first and second windows corresponding to one of a low logic digital signal or a high logic digital signal; and generating a digital level output signal if said output signal indicates said signal is within said first or second windows;

19. A method for demodulating an FSK signal as recited in claim 18 further comprising the step of generating a digital output signal if said count is outside said first or second window corresponding to an invalid frequency.

20. A method for demodulating an FSK signal as recited in claim 18 further comprising the step of generating a digital output signal if said count indicates counter overflow.

* * * * *